July 14, 1959   H. W. SEELER   2,894,507
REDUCING AND DILUTING ADAPTER
Filed Dec. 23, 1957
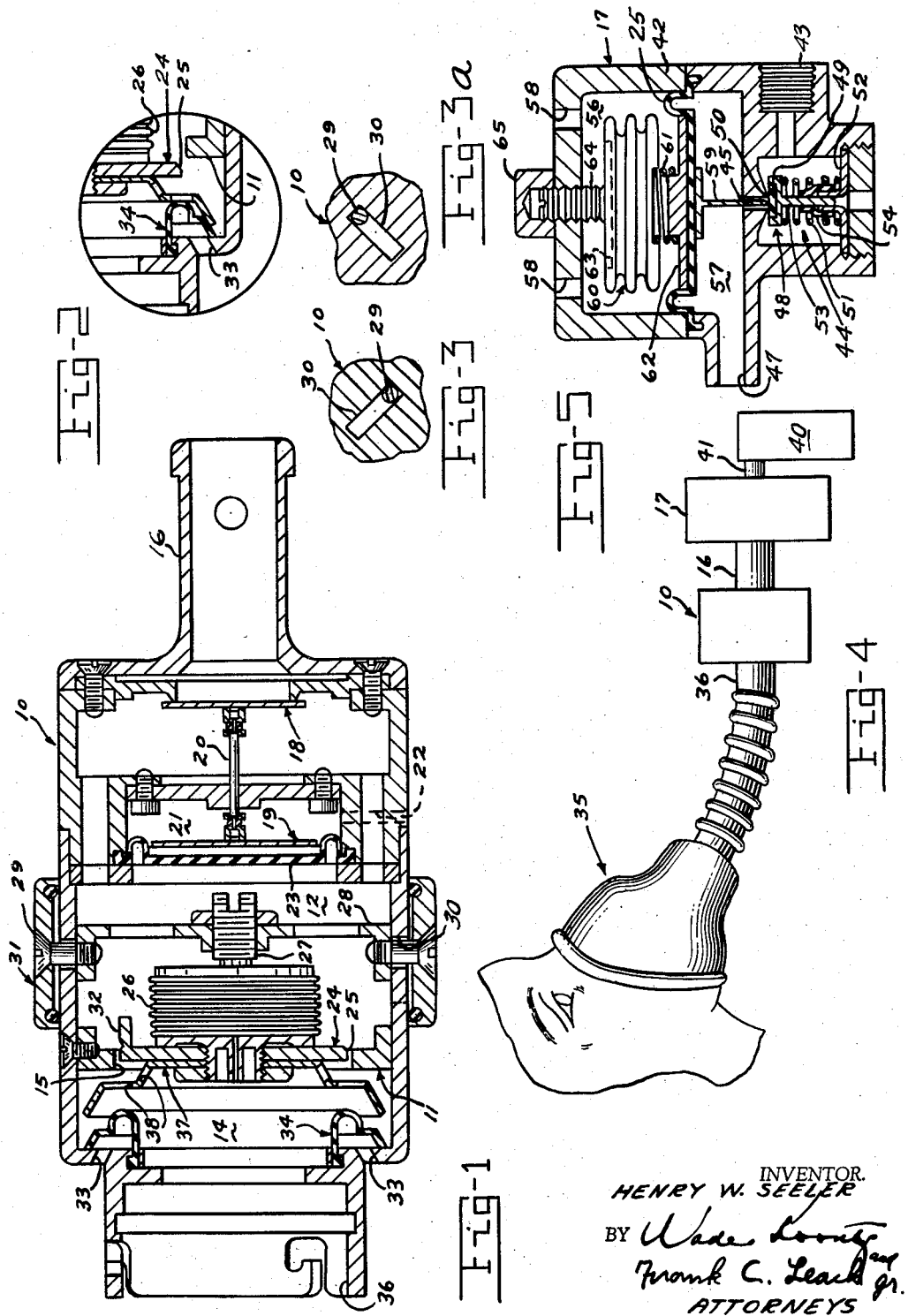
INVENTOR.
HENRY W. SEELER
BY
ATTORNEYS United States Patent Office 2,894,507
Patented July 14, 1959

2,894,507

REDUCING AND DILUTING ADAPTER

Henry W. Seeler, Dayton, Ohio, assignor to the United States of America as represented by the Secretary of the Air Force Application December 23, 1957, Serial No. 704,847

11 Claims. (Cl. 128—142)

(Granted under Title 35, U.S. Code (1952), sec. 266)

The invention described herein may be manufactured and used by or for the United States Government for governmental purposes without payment to me of any royalty thereon.

This invention relates to an adapter for use with an oxygen breathing mask and, more particularly, to an adapter that permits the use of a one hundred percent oxygen regulator with a breathing mask and reduces the pressure of the oxygen from the regulator in a predetermined ratio.

Oxygen regulators, which supply one hundred percent oxygen at a pressure above ambient pressure, have been employed with pressure suits where it is desired to maintain the entire suit and helmet under a pressure above ambient pressure at any altitude above ground level, for example. Since this type of regulator is particularly designed for use with an oxygen pressure suit or helmet, it is desirable to employ this regulator with a breathing mask, which the occupants of the aircraft use when operating in certain altitudes where a pressure suit is not required.

If this type of regulator were connected directly to a breathing mask, it may be necessary that the pressure of the oxygen be lower than that at which a regulator of this type is capable of supplying accurately. Another problem existing, if the regulator were to be connected directly to the breathing mask, is that there would be no provision for dilution of the oxygen when the aircraft operates at an altitude permitting the use of some or all ambient air. The present invention satisfactorily solves these problems by employing an adapter that reduces the pressure of the oxygen by a ratio mechanism to a satisfactory pressure for use with the breathing mask. The invention also includes a mechanism for diluting the oxygen when such is permissible and desirable.

An object of this invention is to provide a device for regulating the oxygen pressure, which is supplied to a breathing mask, to a predetermined pressure ratio with respect to the pressure of the oxygen supply and to regulate the dilution of the oxygen in accordance with the ambient pressure.

Another object of this invention is to provide an oxygen diluter having manual means to stop air dilution of oxygen.

A further object of this invention is to provide a device for adapting a one hundred percent oxygen regulator for use with a breathing mask.

Other objects of this invention will be readily perceived from the following description.

This invention relates to an adapter for supplying breathing air to a breathing mask or the like from an oxygen source having a pressure above ambient atmospheric pressure. The adapter includes a housing having an inlet chamber with means to supply oxygen from the oxygen source to the inlet chamber and means to maintain the oxygen pressure in the inlet chamber at a predetermined ratio with respect to the pressure above ambient pressure of the oxygen from the oxygen source. The housing also has an outlet chamber, which has ambient air supplied thereto through openings in the wall of the housing. The inlet chamber and the outlet chamber are connected by means to permit oxygen flow from the inlet chamber to the outlet chamber. Valve means, which is responsive to atmospheric pressure, controls the flow of oxygen through the connecting means from the inlet chamber to the outlet chamber. Suitable means supply the mixture of oxygen and ambient air in the outlet chamber to the breathing mask.

The attached drawing illustrates a preferred embodiment of the invention, in which Fig. 1 is a sectional view of the adapter of the present invention;

Fig. 2 is a fragmentary sectional view of a portion of the adapter of Fig. 1 with some parts shown in another position;

Fig. 3 is a sectional view of a portion of the device of Fig. 1;

Fig. 3a is a sectional view, similar to Fig. 3, but on the opposite side of the device of Fig. 1;

Fig. 4 is a schematic view of the adapter of the present invention used in conjunction with a breathing mask and a one hundred percent oxygen regulator; and Fig. 5 is a sectional view of a regulator for use with this invention.

Referring to the drawing and more particularly to Fig. 1, there is shown a cylindrical housing 10 of the adapter of the present invention. An annular member 11 is secured to the interior of the housing 10 and divides the housing 10 into an inlet or reduction chamber 12 and an outlet or dilution chamber 14. The member 11 has a passage or conduit 15 extending therethrough to connect the inlet chamber 12 with the outlet chamber 14.

The housing has an inlet conduit 16 connected to the inlet chamber 12. The inlet conduit 16 is connected, as shown in Fig. 4, to a one hundred percent oxygen regulator 17, which supplies oxygen at a pressure above the ambient atmospheric pressure at any altitude.

The regulator 17 is connected by a conduit 41 to a container 40 having oxygen under high pressure. The regulator 17 includes a housing 42 having an inlet 43 communicating with the conduit 41. The oxygen flows from the container 40 through the inlet 43 to a chamber 44. A passage 45 in the housing 42 connects the inlet chamber 44 with an outlet chamber having an outlet 47 communicating with the conduit 16.

The flow of oxygen from the chamber 44 through the passage 45 is controlled by a valve member 48. The valve member 48 has a resilient insert 49 in an enlarged end for cooperation with a valve seat 50 surrounding the passage 45. The valve member 48 is maintained in engagement with the seat 50 by a spring 51 acting between the enlarged end of the valve member 48 and a guide member 52. The valve member 48 has a stem 53, which is the same diameter as the passage 45, extending through an opening in the guide member 52 for cooperation therewith. A resilient sealing member 54 seals between the stem 53 of the valve member 48 and the guide member 52 to prevent leakage of oxygen through the opening in the guide member 52 to the atmosphere.

The outlet chamber has a diaphragm 55 dividing the chamber into two compartments 56 and 57, which are sealed from each other by the diaphragm 55. The compartment 56 communicates with the atmosphere through passages 58 in the housing 42, while the compartment 57 has oxygen flowing therethrough.

The diaphragm 55 has an actuator 59 attached to its lower surface for moving the valve member 48 from the valve seat 50 to open the passage 45 when the diaphragm flexes downwardly. An aneroid bellows 60 is disposed in the compartment 56 to expand in response to decreasing ambient pressure as the altitude increases. The movement of the bellows 60 is transmitted to the diaphragm 55 through a spring 61 and a plate 62, which is secured to the upper surface of the diaphragm 55.

The bellows 60 has a plate 63 secured to its upper surface. A screw 64, which is joined to the plate 63, extends through the housing 42 to the exterior thereof. This screw 64 is movable to adjust the position of the bellows 60 through the plate 63. A protective cover 65 is threaded to the end of the screw 64.

As the aircraft ascends, the bellows 60 expands to flex the diaphragm 55 downwardly to move the actuator 59 against the valve member 48 to open the passage 45 to permit oxygen to flow therethrough. The pressure of the oxygen acts against the diaphragm 55 and the spring 61 to close the passage 45 when the pressure in the compartment 57 of the outlet chamber exceeds the ambient pressure by a predetermined value. As the pressure in the compartment 57 decreases because of flow therefrom through the conduit 16, the diaphragm 55 again flexes downwardly to move the valve member 48 to open the passage 45. By making the passage 45 and the stem 53 of the valve member 48 have the same diameter, the pressure of the oxygen in the chamber 44 exerts the same force on both sides of the enlarged portion of the valve member 48 so that only the force of the spring 51 acts on the valve member 48.

The flow of oxygen from the inlet conduit 16 into the inlet chamber 12 is controlled by a pressure ratio mechanism including a resilient member or diaphragm 23, and a valve member 18 controlling the inlet of the inlet conduit 16 to the inlet chamber 12. The valve member 18 is connected to a second valve member or valve actuator 19 by a connecting rod 20. The second valve member or actuator 19 is disposed within a vent chamber 21, which is formed within the inlet chamber 12 and is closed at one side by the resilient member or diaphragm 23. The vent chamber 21 is closed at its opposite side by a plate, as shown, through which the connecting rod 20 passes is connected to the ambient atmosphere through a vent passage 22. Thus, as shown in Figure 1, one side of the diaphragm member 23 is subject to the ambient pressure. The other side of the diaphragm member 23 is subject to the pressure of the oxygen in the inlet chamber 12 the resilient diaphragm member 23, which forms a wall of the vent chamber 21 is disposed to engage the second valve member or valve actuator 19 for moving the valve 18 toward the inlet conduit 16 for controlling admission of oxygen into the inlet chamber 12.

It will be observed from Fig. 1 that the valve member 19 is responsive to the pressure differential between the pressure in the inlet chamber 12 and the ambient atmospheric pressure, which is transmitted through the vent passage 22 to the vent chamber 21. The valve member 18 is subject to the difference in pressure between the oxygen pressure in the conduit 16 and the regulator 17 and the pressure in the inlet chamber 12. Therefore, it is only necessary to design the ratio of the area of the valve member 18 with respect to the effective area of the diaphragm 23 on the valve member 19 to maintain the pressure above ambient pressure of the inlet chamber 12 at a predetermined ratio with respect to the pressure above ambient pressure of the oxygen in the oxygen regulator 17.

For example, if it is desired to maintain the pressure above ambient pressure of the inlet chamber 12 at a ratio of one to three at all altitudes with respect to the pressure above ambient pressure of the oxygen in the oxygen regulator 17, the effective area of the diaphragm 23 on the valve member 19 must be twice the area of the valve member 18. This is due to the fact that the total force acting on the member 19 is the pressure differential times the area of the valve member 19; similarly, the total force of the member 18 is the pressure differential acting on the valve member 18 times the area of the valve member 18.

For example, if the oxygen pressure in the regulator 17 is three inches of water above ambient pressure, then the pressure in the inlet chamber 12 must be one inch above ambient pressure in the desired ratio. Accordingly, the pressure differential on the valve member 19 is one inch of water whereas it is two inches of water on the member 18. It is readily observed that the pressure differential on the valve member 18 is twice the pressure differential on the valve member 19 so that the member 19 must have an area twice the area of the member 18 to maintain the pressure above ambient pressure of the inlet chamber 12 at the desired ratio of one to three with respect to the pressure above ambient pressure of the oxygen in the regulator 17.

If the pressure in the inlet chamber 12, in this example, drops below one inch of water above ambient pressure to thereby change the desired ratio, the force on the valve 18 becomes greater than the force on the valve 19 by the diaphragm 23 and the valve 18 moves away from its seat to permit flow of oxygen from the inlet conduit 16 into the chamber 12 to regain the desired ratio. If the oxygen pressure in the chamber 12, in this example, becomes greater than one inch of water above ambient pressure to thereby change the desired ratio, the force acting on the valve member 19 through the diaphragm becomes greater than the force on the valve member 18 so that the member 18 is moved to a closed position if it is not already in that position to regain the desired ratio.

Likewise, if the pressure of the oxygen in the inlet conduit 16, in this example, increases to six inches of water above ambient pressure as it will do as the altitude increases, the force acting on the valve member 18 becomes greater than the force on the valve member 19 whereby the valve member 18 moves to an open position. The valve member 18 remains in an open position until the pressure in the inlet chamber reaches two inches above ambient pressure when the ratio is again one to three; then, the valve member 18 closes as the force on the valve member 18 is no longer greater than the force acting on the valve member 19.

If a different ratio is desired, it is only necessary to change the ratio of the areas of the valve members 18 and 19. For example, if a ratio of one to two is desired, then the areas of the valve members 18 and 19 are made equal. If a ratio of one to four is desired, the area of the valve member 19 is made three times greater than the area of the valve member 18. This device insures that the inlet chamber 12 always has oxygen pressure above ambient pressure at a predetermined ratio with respect to the pressure above ambient pressure of the oxygen in the conduit 16.

The flow of oxygen from the inlet chamber 12 to the outlet chamber 14 through the passage 15 is controlled by a valve member 24. The periphery of the valve member 24 includes an angular portion 25. When the valve member 24 is advanced toward the outlet chamber 14, it is readily seen that oxygen flow from the inlet chamber to the outlet chamber rapidly increases when the angular portion 25 clears the member 11. The maximum flow of oxygen is obtained when the valve is in position shown in Fig. 2.

An aneroid bellows 26 is secured to the valve member 24 and disposed within the inlet chamber 12. Since the inlet chamber 12 is maintained at a pressure above ambient atmospheric pressure, the aneroid bellows 26 expands in accordance with the ambient altitude so that the valve member 26 expands in accordance with the ambient altitude so that the valve member 24 permits greater flow of oxygen through the passage 15 as the altitude increases.

The assembly of the valve member 24 includes an adjusting member 27, which is movable in a support member 28. The support 28 is secured to the housing through screws 29 or other suitable means extending through slots 30 in the wall of the housing 10 and connected to an adjustment ring 31, which surrounds the cylindrical housing 10.

As shown in Fig. 3, the slots 30 are designed so that rotation of the adjustment ring 31 about the axis of the cylindrical housing 10 results in the assembly of valve member 24 being advanced to a position wherein there is full flow of oxygen from the inlet chamber 12 to the outlet chamber 14 irrespective of the ambient altitude (see Fig. 2). However, the normal position of the adjustment ring 31 is in the position shown in Fig. 1 wherein the valve member 24 is disposed within the passage 15. The exact position of the valve member 24 in the passage 15 is determined by the adjusting member 27; advancement of the adjusting member 27 results in full flow of oxygen from the inlet chamber 12 to the outlet chamber 14 at a lower altitude than in the position shown in Fig. 1 whereas retraction of the adjustment member 27 results in the valve member 24 preventing full flow through the passage 15 until a higher altitude is reached than for the device shown in Fig. 1.

The valve member 24 includes upright portions 32, which extend substantially perpendicular from the main portion of the valve, functioning as guide members in the passage 15 when the valve member 24 moves to the position of Fig. 2.

The end wall of the cylindrical housing 10 adjacent the outlet chamber 14 includes a plurality of openings 33 therein through which ambient air may enter the outlet chamber 14. A resilient check valve 34 controls flow of ambient air through the openings 33 so that ambient air only enters the outlet chamber 14 when the ambient air pressure is greater than the pressure of the outlet chamber 14; the remainder of the time the pressure in the outlet chamber 14 urges the resilient member 34 to maintain the openings 33 closed since the pressure in the outlet chamber 14 is greater than the ambient air pressure. The outlet chamber 14 has a pressure less than ambient atmospheric pressure only when the wearer of a breathing mask 35 inhales; this suction pressure created by the wearer of the mask is transmitted through the outlet conduit 36 to the outlet chamber 14. The breathng mask 35 may be of any type wherein the exhaled air is directed by a valve mechanism to the atmosphere and the valve mechanism permits inhalation of the air through the conduit 36. One type of breathing mask is shown in the copending application of Henry W. Seeler, Serial No. 553,164, filed December 14, 1955, but any other type of breathing mask may be employed having the above-noted characteristics.

The valve member 24 has a metallic member 37, which has a plurality of spaced openings 38 therein, attached thereto. When the valve member 24 is advanced to the position in which full flow of oxygen from the inlet chamber 12 to the outlet chamber 14 exists, the member 37 engages the resilient check valve 34 (see Fig. 2) to prevent ambient air from entering through the openings 33 but allows oxygen to flow through the openings 38. While the flow of oxygen is normally satisfactory to prevent any ambient air from passing through the openings 33, the member 37 functions as a safety device since it prevents ambient air from entering the outlet chamber 14 through the openings 33 if the supply of oxygen fails. If the member 37 were not employed and the supply of oxygen failed, the wearer of the breathing mask 35 would believe that he was receiving satisfactory oxygen at high altitudes whereas he would be receiving a much smaller portion of oxygen because of the decreased density of air at high altitudes; this would prove fatal to the wearer in a short period of time. In the present invention, the wearer of the breathing mask receives no oxygen if the supply fails since the member 37 prevents the check valve 34 from opening to allow ambient air to flow through the openings 33 when the pressure in the outlet chamber 14 decreases below the ambient atmospheric pressure. The wearer of the mask immediately descends to an altitude at which there is sufficient oxygen in the ambient air for him to breathe.

In the operation of the present invention, the housing 10 is disposed with the inlet conduit 16 connected to the one hundred percent oxygen regulator 17 and the outlet conduit 14 connected to the breathing mask 35 through the outlet conduit 36. Before assembling the adapter, the adjusting member 27 in the support member 28 has been positioned so that the valve member 24 permits full flow of oxygen from the inlet chamber to the outlet chamber at the desired altitude. As previously explained, the position of the adjusting member 27 determines when the aneroid bellows 26 expands sufficiently to move the valve member 24 to completely open the passage 15. If it is desired to employ full flow of oxygen at any time prior to the altitude at which the aneroid bellows 26 permits complete flow of oxygen through the passage 15, it is only necessary to rotate the adjustment ring 31. As the adjustment ring 31 is rotated through a small angular movement, the assembly advances forward, due to the diagonal slots 30, so that the valve member 24 is completely free of the passage 15. One example of when this might be desirable is when the aircraft is on the ground and a plurality of jets, for example, are near so that exhaust gases from the jets would tend to enter through the openings 33. The advancement of the adjustment ring 31 not only insures that full flow of oxygen occurs through the passage 15 but also that no ambient air enters through the openings 33 because the member 37 maintains the check valve 34 in a closed position.

The ratio of the areas of the valve members 18 and 19 depends merely upon the desired ratio of the pressure above ambient pressure within the inlet chamber 12 with respect to the pressure above ambient pressure of the oxygen supplied by the regulator 17.

An advantage of this invention is that it conserves oxygen and thereby increases the flying range for a predetermined supply of oxygen. Another advantage of this invention is that it permits the use of a one hundred percent oxygen regulator with a breathing mask; thus, it is not necessary to design a separate type of oxygen supply for a breathing mask different from the regulator employed with a pressure suit. A further advantage of this invention is that it reduces the cost of using oxygen since it decreases the quantity of oxygen used but supplies the required amount.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. An adapter for supplying breathing air to a breathing mask or the like from an oxygen source having a pressure above the ambient atmosphere including a housing having an inlet chamber and an outlet chamber, means to supply oxygen to the inlet chamber from the oxygen source, means to maintain the oxygen pressure above ambient pressure in the inlet chamber at a predetermined ratio with respect to the pressure above ambient pressure of the oxygen from the oxygen source, said housing having openings in its wall for admission of ambient air to the outlet chamber, means connecting the inlet chamber and the outlet chamber for flow of oxygen from the inlet chamber to the outlet chamber, valve means responsive to the ambient atmospheric pressure to control the flow of oxygen through the connecting means from the inlet chamber to the outlet chamber and means to supply the mixture of oxygen and ambient air in the outlet chamber to the breathing mask.

2. An adapter for supplying breathing air to a breathing mask or the like from an oxygen source having a pressure above the ambient atmosphere including a housing having an inlet chamber and an outlet chamber, means to supply oxygen to the inlet chamber from the oxygen source, means to maintain the oxygen pressure above ambient pressure in the inlet chamber at a predetermined ratio with respect to the pressure above ambient pressure of the oxygen from the oxygen source, said housing having openings in its wall for admission of ambient air to the outlet chamber, means connecting the inlet chamber and the outlet chamber for flow of oxygen from the inlet chamber to the outlet chamber, valve means responsive to the ambient atmospheric pressure to control the flow of oxygen through the connecting means from the inlet chamber to the outlet chamber, said valve means including a member to stop flow of ambient air through the openings in the housing when the valve member is in position for free flow of oxygen through the connecting means, and means to supply the mixture of oxygen and ambient air in the outlet chamber to the breathing mask.

3. An adapter for supplying breathing air to a breathing mask or the like from an oxygen source having a pressure above the ambient atmosphere including a housing having an inlet chamber and an outlet chamber, means to supply oxygen to the inlet chamber from the oxygen source, means to maintain the oxygen pressure above ambient pressure in the inlet chamber at a predetermined ratio with respect to the pressure above ambient pressure of the oxygen from the oxygen source, said housing having openings in its wall for admission of ambient air to the outlet chamber, means connecting the inlet chamber and the outlet chamber for flow of oxygen from the inlet chamber to the outlet chamber, valve means responsive to the atmospheric pressure to control the flow of oxygen through the connecting means from the inlet chamber to the outlet chamber, said valve means including a member to stop flow of ambient air through the openings in the housing when the valve member is in position for free flow of oxygen through the connecting means, means to manually move the valve means to permit free flow of oxygen through the connecting means whereby the member of the valve means stops flow of ambient air through the openings in the wall of the housing, and means to supply the mixture of oxygen and breathing air in the outlet chamber to the breathing mask.

4. An adapter for supplying diluted or pure oxygen to a breathing mask or the like from an oxygen source having a pressure above ambient atmospheric pressure including a housing having an inlet conduit connected to the oxygen source and an outlet conduit connected to the breathing mask, means in said housing to form an inlet chamber communicating with the inlet conduit and an outlet chamber communicating with the outlet conduit, said means having a passage connecting the inlet chamber and the outlet chamber for flow of oxygen from the inlet chamber to the outlet chamber, valve means to control flow of oxygen through the passage from the inlet chamber to the outlet chamber, means to maintain the pressure above ambient pressure of the oxygen in the inlet chamber at a predetermined ratio with respect to the pressure above ambient pressure of the oxygen from the oxygen source, said valve means controlling oxygen flow through the passage in response to the ambient atmospheric pressure, said housing having openings in its wall for flow of ambient air into the outlet chamber to mix with oxygen therein for supply of breathing air to the breathing mask through the outlet conduit, and means to manually stop flow of ambient air through said openings.

5. An adapter for supplying diluted or pure oxygen to a breathing mask or the like from an oxygen source having a pressure above ambient atmospheric pressure including a housing having an inlet conduit connected to the oxygen source and an outlet conduit connected to the breathing mask, means in said housing to form an inlet chamber communicating with the inlet conduit and an outlet chamber communicating with the outlet conduit, said means having a passage connecting the inlet chamber and the outlet chamber for flow of oxygen from the inlet chamber to the outlet chamber, valve means to control flow of oxygen through the passage from the inlet chamber to the outlet chamber, means to maintain the pressure above ambient pressure of the oxygen in the inlet chamber at a predetermined ratio with respect to the pressure above ambient pressure of the oxygen from the oxygen source, said maintaining means including a valve member controlling flow of oxygen from the inlet conduit to the inlet chamber, a second valve member connected to the first valve member, said second valve member being responsive to the pressure in the inlet chamber with respect to the ambient pressure to move the first valve member to an open position when the pressure in the inlet chamber drops below the predetermined ratio and to a closed position when the pressure in the inlet chamber exceeds the predetermined ratio, said valve means controlling oxygen flow through the passage in response to the ambient pressure, said housing having openings in its wall for flow of ambient air into the outlet chamber to mix with oxygen therein for supply of breathing air to the breathing mask through the outlet conduit, and means to manually stop flow of ambient air through said openings.

6. An adapter for supplying diluted or pure oxygen to a breathing mask or the like from an oxygen source having a pressure above ambient atmospheric pressure including a housing having an inlet conduit connected to the oxygen source and an outlet conduit connected to the breathing mask, means in said housing to form an inlet chamber communicating with the inlet conduit and an outlet chamber communicating with the outlet conduit, said means having a passage connecting the inlet chamber and the outlet chamber for flow of oxygen from the inlet chamber to the outlet chamber, valve means to control flow of oxygen through the passage from the inlet chamber to the outlet chamber, means to maintain the pressure above ambient pressure of the oxygen in the inlet chamber at a predetermined ratio with respect to the pressure above ambient pressure of the oxygen from the oxygen source, said valve means controlling oxygen flow through the passage in response to the ambient pressure, said housing having openings in its wall for flow of ambient air into the outlet chamber to mix with oxygen therein for supply of breathing air to the breathing mask through the outlet conduit, and means secured to said valve means to stop flow of ambient air through said openings.

7. An adapter for supplying breathing air to a breathing mask or the like from an oxygen source having a pressure above ambient atmospheric pressure including a housing having a member therein to divide the interior of the housing into an inlet chamber and an outlet chamber, said member having a passage extending therethrough to connect the inlet chamber with the outlet chamber, said housing including an inlet conduit connecting the inlet chamber with the oxygen source and an outlet conduit connecting the outlet chamber with the breathing mask, valve means to control flow of oxygen through the passage from the inlet chamber to the outlet chamber, said valve means being movable in response to the ambient atmospheric pressure to vary the oxygen flow through the passage, a pressure ratio mechanism disposed in the inlet chamber to maintain the pressure above ambient pressure of the oxygen in the inlet chamber at a predetermined ratio with respect to the oxygen pressure above ambient pressure in the inlet conduit, said housing having openings in its wall adjacent the outlet chamber for flow of ambient air into the outlet chamber, check valve means preventing flow of ambient air through the openings into the outlet chamber when the ambient pressure is less than the pressure in the outlet chamber, said control passage valve means including means to hold said check valve means in a closed position to prevent flow through the openings when the valve means is in a position permitting free flow of oxygen from the inlet chamber to the outlet chamber.

8. An adapter for supplying breathing air to a breathing mask or the like from an oxygen source having a pressure above ambient atmospheric pressure including a housing having a member therein to divide the interior of the housing into an inlet chamber and an outlet chamber, said member having a passage extending therethrough to connect the inlet chamber with the outlet chamber, said housing including an inlet conduit connecting the inlet chamber with the oxygen source and an outlet conduit connecting the outlet chamber with the breathing mask, valve means to control flow of oxygen through the passage from the inlet chamber to the outlet chamber, said valve means being movable in response to the ambient atmospheric pressure to vary the oxygen flow through the passage, a pressure ratio mechanism disposed in the inlet chamber to maintain the pressure above ambient pressure of the oxygen in the inlet chamber at a predetermined ratio with respect to the oxygen pressure above ambient pressure in the inlet conduit, said housing having openings in its wall adjacent the outlet chamber for flow of ambient air into the outlet chamber, check valve means preventing flow of ambient air through the openings into the outlet chamber when the ambient pressure is less than the pressure in the outlet chamber, said control passage valve means including means to hold said check valve means in a closed position to prevent flow through the openings when the valve means is in a position to permit free flow of oxygen from the inlet chamber to the outlet chamber, and means to manually move the control passage valve means to a position permitting free flow of oxygen from the inlet chamber to the outlet chamber and to have its holding means engage the check valve means to stop ambient air flow through the openings.

9. An adapter for supplying breathing air to a breathing mask or the like from an oxygen source having a pressure above ambient atmospheric pressure including a housing having a member therein to divide the interior of the housing into an inlet chamber and an outlet chamber, said member having a passage extending therethrough to connect the inlet chamber with the outlet chamber, said housing including an inlet conduit connecting the inlet chamber with the oxygen source and an outlet conduit connecting the outlet chamber with the breathing mask, valve means to control flow of oxygen through the passage from the inlet chamber to the outlet chamber, said valve means including an aneroid bellows responsive to the ambient atmospheric pressure to vary the oxygen flow through the passage, a pressure ratio mechanism disposed in the inlet chamber to maintain the pressure above ambient pressure of the oxygen in the inlet chamber at a predetermined ratio with respect to the oxygen pressure above ambient pressure in the inlet conduit, said housing having openings in its wall adjacent the outlet chamber for flow of ambient air into the outlet chamber, check valve means preventing flow of ambient air through the openings into the outlet chamber when the ambient pressure is less than the pressure in the outlet chamber, said control passage valve means including means to hold said check valve means in a closed position to prevent flow through the openings when the valve means is in a position permitting free flow of oxygen from the inlet chamber to the outlet chamber.

10. An adapter for supplying breathing air to a breathing mask or the like from an oxygen source having a pressure above ambient atmospheric pressure including a housing having a member therein to divide the interior of the housing into an inlet chamber and an outlet chamber, said member having a passage extending therethrough to connect the inlet chamber with the outlet chamber, said housing including an inlet conduit connecting the inlet chamber with the oxygen source and an outlet conduit connecting the outlet chamber with the breathing mask, valve means to control flow of oxygen through the passage from the inlet chamber to the outlet chamber, said valve means being movable in response to the ambient atmospheric pressure to vary the oxygen flow through the passage, a pressure ratio mechanism disposed in the inlet chamber to maintain the pressure above ambient pressure of the oxygen in the inlet chamber at a predetermined ratio with respect to the oxygen pressure above ambient pressure in the inlet conduit, said pressure ratio mechanism including a pair of valve members connected together, one of said valve members controlling flow of oxygen from the inlet conduit to the inlet chamber in response to the difference in pressure therebetween, means to subject one side of the other of the valve members to ambient pressure, the other side of the other valve member being subject to the oxygen pressure in the inlet chamber whereby the other valve member is movable in response to the difference in pressure between the inlet chamber and ambient pressure, the areas of said valve members having a ratio to mantain the pressure above ambient pressure in the inlet chamber at a predetermined ratio with respect to the pressure above ambient pressure in the inlet conduit, said housing having openings in its wall adjacent the outlet chamber for flow of ambient air into the outlet chamber, check valve means preventing flow of ambient air through the openings into the outlet chamber when the ambient pressure is less than the pressure in the outlet chamber, said control passage valve means including means to hold said check valve means in a closed position to prevent flow through the openings when the valve means is in a position permitting free flow of oxygen from the inlet chamber to the outlet chamber.

11. An adapter for supplying breathing air to a breathing mask or the like from an oxygen source having a pressure above ambient atmospheric pressure including a housing having a member therein to divide the interior of the housing into an inlet chamber and an outlet chamber, said member having a passage extending therethrough to connect the inlet chamber with the outlet chamber, said housing including an inlet conduit connecting the inlet chamber with the oxygen source and an outlet conduit connecting the outlet chamber with the breathing mask, valve means to control flow of oxygen through the passage from the inlet chamber to the outlet chamber, said valve means being movable in response to the ambient atmospheric pressure to vary the oxygen flow through the passage, a pressure ratio mechanism disposed in the inlet chamber to maintain the pressure above ambient pressure of the oxygen in the inlet chamber at a predetermined ratio with respect to the oxygen pressure above ambient pressure in the inlet conduit, said pressure ratio mechanism including a pair of valve members connected together, one of said valve members controlling flow of oxygen from the inlet conduit to the inlet chamber in response to the difference in pressure therebetween, means to subject one side of the other of the valve members to ambient pressure, the other side of the other valve member being subject to the oxygen pressure in the inlet chamber whereby the other valve member is movable in response to the difference in pressure between the inlet chamber and ambient pressure, the areas of said valve members having a ratio to mantain the pressure above ambient pressure in the inlet chamber at a predetermined ratio with respect to the pressure above ambient pressure in the inlet conduit, said housing having openings in its wall adjacent the outlet chamber for flow of ambient air into the outlet chamber, check valve means preventing flow of ambient air through the openings into the outlet chamber when the ambient pressure is less than the pressure in the outlet chamber, said control passage valve means including means to hold said check valve means in a closed position to prevent flow through the openings when the valve means is in a position to permit free flow of oxygen from the inlet chamber to the outlet chamber, and means to manually move the control passage valve means to a position permitting free flow of oxygen from the inlet chamber to the outlet chamber and to have its holding means engage the check valve means to stop flow through the openings.

References Cited in the file of this patent

UNITED STATES PATENTS 2,575,366    Sollmann  ---------------- Nov. 20, 1951

FOREIGN PATENTS 253,658    Switzerland  -------------- Dec. 1, 1948

UNITED STATES PATENT OFFICE

CERTIFICATE OF CORRECTION

Patent No. 2,894,507                                      July 14, 1959

Henry W. Seeler

It is hereby certified that error appears in the above numbered patent requiring correction and that the said Letters Patent should read as corrected below.

In the drawings, Figure 5, for the reference numeral "25", indicating a diaphragm, read -- 55 --; in the printed specification, column 3, line 40, for "passes is" read -- passes and the vent chamber 21 is --; line 45, for "chamber 12 the" read -- chamber 12. The --; line 46, for "chamber 21" read -- chamber 21, --.

Signed and sealed this 5th day of January 1960.

(SEAL)
Attest:

KARL H. AXLINE                                            ROBERT C. WATSON
Attesting Officer                                   Commissioner of Patents